(12) United States Patent
Menzl

(10) Patent No.: US 6,357,412 B1
(45) Date of Patent: Mar. 19, 2002

(54) CRANKCASE MADE OF LIGHT METAL FOR AN INTERNAL COMBUSTION ENGINE

(75) Inventor: Karl-Heinz Menzl, München (DE)

(73) Assignee: Miba Sintermetall Aktiengesellschaft, Laakirchen (AT)

(*) Notice: Subject to any disclaimer, the term of this patent is extended or adjusted under 35 U.S.C. 154(b) by 0 days.

(21) Appl. No.: 09/701,765

(22) PCT Filed: May 31, 1999

(86) PCT No.: PCT/AT99/00136

§ 371 Date: Feb. 7, 2001

§ 102(e) Date: Feb. 7, 2001

(87) PCT Pub. No.: WO99/63216

PCT Pub. Date: Dec. 9, 1999

(30) Foreign Application Priority Data

Jun. 3, 1998 (AT) .............................. A 949/98

(51) Int. Cl.[7] .................................. F02F 7/00
(52) U.S. Cl. .................................. 123/195 H
(58) Field of Search ..................... 123/195 H

(56) References Cited

U.S. PATENT DOCUMENTS 4,693,216 A 9/1987 Ampferer et al.
4,922,870 A 5/1990 Pietsch et al.
5,203,854 A 4/1993 Nilsson et al.
5,501,529 A 3/1996 Cadle et al.

FOREIGN PATENT DOCUMENTS

| DE | 37 37 601 | 5/1989 |
| DE | 38 29 163 | 6/1989 |
| DE | 195 26 890 | 1/1997 |
| DE | 196 40 719 | 10/1997 |
| EP | 0 145 393 | 11/1984 |
| WO | 95/31637 | 11/1995 |

Primary Examiner—Tony M. Argenbright
Assistant Examiner—Katrina B. Harris
(74) Attorney, Agent, or Firm—Collard & Roe, P.C.

(57) ABSTRACT

The description relates to a crankcase made of light metal for an internal combustion engine with a parting plane (4) running through the crankshaft axis between a case upper part and a case bottom part, whose bearing walls (2), which connect the case outer walls (1), are provided with inserts (3) made of an iron material, in which the bearing shells of the crankshaft bearing and the bearing bolts (7) provided on both sides of the bearing shells are borne. To achieve favorable construction features it is suggested that the bearing walls (2) forming a continuous light metal bridge between the case outer walls (1) accommodate the inserts (3) that are lower than the bearing walls (2) in recesses (8) starting from the parting plane (4) and are provided, in the area of the bearing bolts (7), with through holes (9) for the bolt heads (10).

3 Claims, 2 Drawing Sheets

CRANKCASE MADE OF LIGHT METAL FOR AN INTERNAL COMBUSTION ENGINE

CROSS REFERENCE TO RELATED APPLICATIONS

Applicants claim priority under 35 U.S.C. §119 of AUSTRIAN Application No. A949198 filed JUN. 3, 1998. Applicants also claim priority under 35 U.S.C. §120 of PCT/AT99/00136 filed on MAY 31, 1999. The international application under PCT article 21 (2) was not published in English.

FIELD OF THE INVENTION

The invention relates to a crankcase made of light metal for an internal combustion engine with a parting plane running through the crankshaft axis between a case upper part and a case bottom part, whose bearing walls, which connect the outer case walls, are provided with inserts made of an iron material, in which the bearing shells of the crankshaft bearing and the bearing bolts provided on both sides of the bearing shells are borne.

DESCRIPTION OF THE PRIOR ART

To achieve, in case of crankcases made of light metal, a favorable load transmission from the cylinder head to the crankshaft and to obtain, in this context, a rigid support of the crankshaft bearings, it is known (U.S. Pat. No. 5,203,854) to bear the crankshaft bearings by means of the bearing bolts in gray cast iron inserts of the bottom part of the crankcase. These inserts of gray cast iron that are sealed between the case outer walls and that form the core of the bearing walls, are dimensioned as a function of the load applied to the crankshaft bearing and, due to this dimensioning, determine the height of the crankcase bottom part. As the vibration behavior and thus the impact sound behavior of the crankcase depends on its flexural strength, the elastic modulus and the moment of inertia are decisive with respect to the impact sound behavior. The elastic modulus of light metals, as they are used for crankcases, is approximately only half the elastic modulus of gray cast iron, so that, with respect to the impact sound behavior, crankcases of light metal are inferior to those of gray cast iron, unless the moment of inertia is increased by means of suitable constructive measures, thus ensuring a sufficient flexural strength. To this end the crankcase may be stiffened via the connected lower crankcase, which, in this case, must be designed rather complex. But in spite of the use of such complex lower crankcases the impact sound behavior of the known crankcases made of light metal remains unsatisfactory.

SUMMARY OF THE INVENTION

It is therefore the objective of the invention to improve a crankcase made of light metal of the above mentioned kind in such a way that a satisfactory impact sound behavior is achieved without a complex design of the lower crankcase, without having to expect any adverse effects on the crankshaft bearing.

The objective of the invention is achieved in that the bearing walls forming a continuous light metal bridge between the case outer walls accommodate the inserts, which are lower than the bearing walls, in recesses starting from the parting plane, and are provided, in the area of the bearing bolts, with through holes for the bolt heads.

Via these measures it is for one thing ensured that the inserts made of an iron material can be dimensioned solely as a function of the load applied to the crankshaft bearings and/or of the dimension of the bearing bolts, without having to accept a limitation of the height of the case bottom part due to these inserts. As the overall height of the case bottom part may now be considerably higher compared to the inserts, the intended higher flexural strength of the crankcase is achieved, and a complex lower crankcase can be avoided. Thus it is achieved that the structural parts made of an iron material, which take up the load of the crankshaft bearing, and the light metal parts can be dimensioned independent of each other, which leads also to a favorable construction with respect to both sound impact behavior and load transmission, because a sufficient height of the case bottom part, as it is necessary for the desired flexural strength can be ensured, independent of the height of the inserts.

If the height of the bearing walls is at least half the internal distance of the case outer walls, particularly favorable construction features are achieved, not only providing a high flexural strength of the case bottom part, but also permitting the use of a conventional supporting lower crankcase in the form of a simple pan cover, as in this case a considerable part of the lower crankcase as usual otherwise is formed by the case bottom part proper.

Moreover, as the inserts made of an iron material are embedded in recesses, starting from the parting plane, in the light metal bridges of the bearing walls running through between the case outer walls, the use of a sintered material is supported, which implies favorable manufacturing conditions, in fact without any loss of strength.

BRIEF DESCRIPTION OF THE DRAWING

The drawing depicts an example of the subject matter of the invention.

DESCRIPTION OF THE PREFERRED EMBODIMENT

Figure 1:
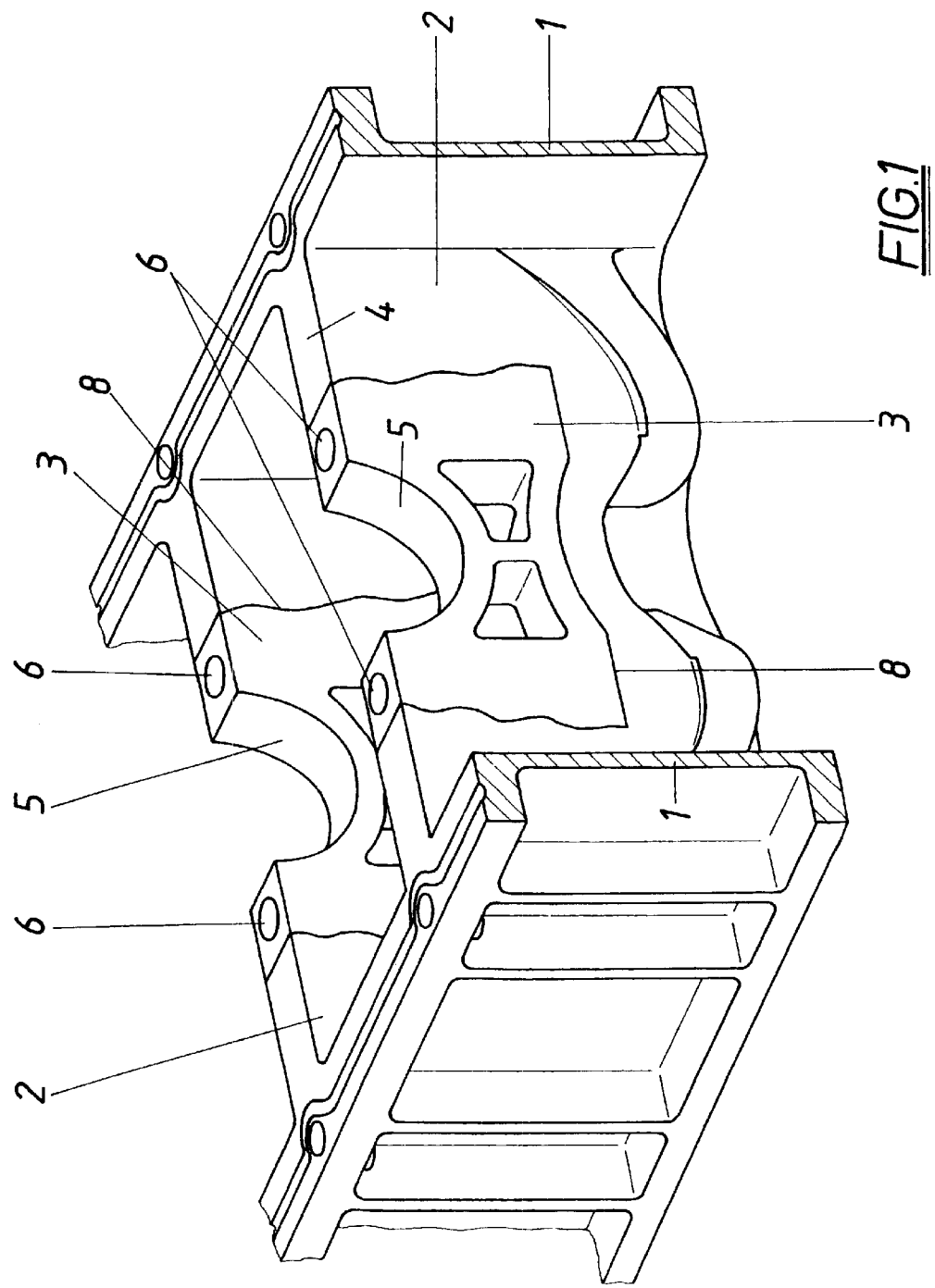
FIG. 1 shows a detail of the case bottom part of a crankcase according to the invention in a schematic diagram.

The depicted case bottom part of a crankcase made of light metal according to the invention is provided with case outer walls 1 running longitudinally in the conventional way, as well as bearing walls 2 connecting these case outer walls 1 and directed transverse thereto, which are equipped with inserts 3 made of an iron material, preferably sintered metal. These inserts 3 form accommodations 5, starting from the parting plane 4 to the case upper part and shaped semicircular, for the bearing shells of the crankshaft bearings. On both sides of these accommodations 5 there are bores 6 for the bearing bolts 7 provided in the inserts 3, via which bores 7 the load transmission from the cylinder to the inserts 3 is effected.

Figure 2:
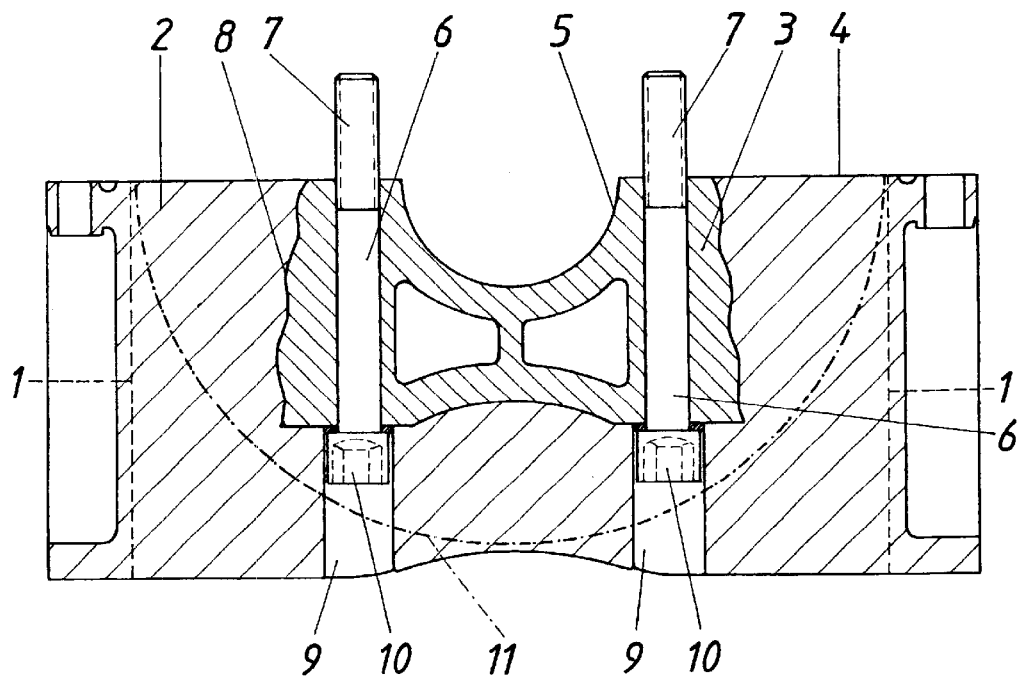
FIG. 2 represents the case bottom part in a cross section through a bearing wall.
Figure 3:
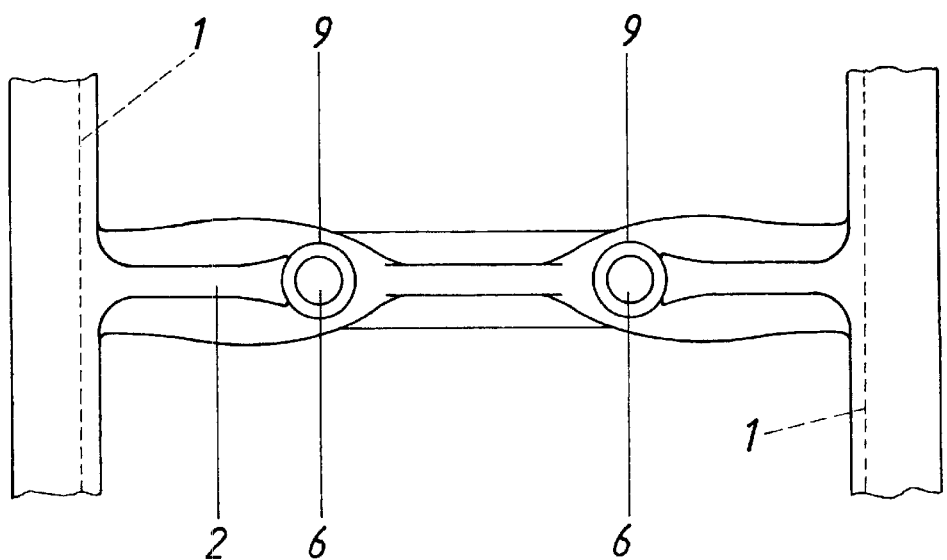
FIG. 3 depicts a detail of the case bottom part in the area of a bearing wall in a bottom view.

Contrary to conventional case bottom parts of this kind the inserts 3 made of an iron material cover only part of the height of the bearing walls 2, so that the bearing walls 2 form a continuous light metal bridge between the case outer walls 1. The inserts 3 are embedded into recesses 8 of the bearing walls 2 starting from the parting plane 4, which are provided in the bottom area of the recesses 8 with through holes 9 for the bolt heads 10 of the bearing bolts 7. Therefore, the bearing bolts 7 can be pushed via the through holes 9 into the bearing bores 6 of the inserts 3 and bolted with the case upper part. Consequently, for dimensioning the bearing bolt 7, the different thermal expansion behavior of the inserts 3 and the light metal bridges of the bearing walls 2 accommodating the inserts 3 need not be considered, although the height of the bearing walls 2 considerably exceeds that of the bearing inserts 3 at least in the area of the inserts 3. This means that the inserts 3 can be dimensioned first of all according to the load requirements for taking up the bearing forces, without considering the required flexural strength of the case bottom part, so that the share of weight of the inserts 3 can be favorably limited. The high flexural strength of the case bottom part, required with respect to impact sound behavior, must be ensured via an increased moment of inertia due to the lower elastic modulus compared to that of light metal, which demands above all a higher overall height of the case bottom part. Due to the height of the bearing walls 2 independent of the height of the inserts 3, this requirement is easiliy met. Thus it is possible to accommodate the lower crank space within the case bottom part, as this is outlined by the dash-dotted circular line 11 in FIG. 2. Thus a conventional lower crankcase for additionally stiffening the crankcase may be omitted and replaced by a simple cover for the case bottom part.

By means of the described measures it is comparatively simple to obtain a favorable impact sound behavior of a crankcase made of light metal without having to accept drawbacks in the field of load transmission via the crankshaft bearings or with respect to weight conditions.

What is claimed is:

1. A light metal crankcase for an internal combustion engine, which comprises an upper crankcase part and a lower crankcase part, with a parting plane running through a crankcase axis between the upper and lower crankcase parts, the lower crankcase part comprising two opposite outer walls, light metal bearing walls connecting the outer walls and forming continuous light metal bridges between the two opposite outer walls, the light metal bearing walls defining recesses starting at the parting plane, inserts of iron material received in the recesses, the inserts being shorter than the bearing walls and defining bearing shells for a crankshaft, and bearing bolts having heads mounted in bores in the inserts at each side of the inserts, the bearing walls having through holes aligned with the bores for receiving the heads.

2. The light metal crankcase of claim 1, wherein the bearing walls have a height which is at least half the internal distance of the two opposite outer walls.

3. The light metal crankcase of claim 1, wherein the inserts are of a sintered iron material.

* * * * *